(12) United States Patent
Sung et al.

(10) Patent No.: US 11,973,261 B2
(45) Date of Patent: Apr. 30, 2024

(54) ANTENNA STRUCTURE AND WIRELESS COMMUNICATION DEVICE USING SAME

(71) Applicant: Chiun Mai Communication Systems, Inc., New Taipei (TW)

(72) Inventors: Kun-Lin Sung, New Taipei (TW); Yung-Chin Chen, New Taipei (TW); Yi-Chieh Lee, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 486 days.

(21) Appl. No.: 17/150,214

(22) Filed: Jan. 15, 2021

(65) Prior Publication Data

US 2021/0226319 A1 Jul. 22, 2021

(30) Foreign Application Priority Data

Jan. 17, 2020 (CN) .......................... 202010051202.4

(51) Int. Cl.
*H01Q 1/24* (2006.01)
*H01Q 13/10* (2006.01)
*H04B 1/00* (2006.01)

(52) U.S. Cl.
CPC ............ *H01Q 1/243* (2013.01); *H01Q 13/10* (2013.01); *H04B 1/006* (2013.01)

(58) Field of Classification Search
CPC .......... H01Q 1/243; H01Q 13/10; H01Q 1/44; H01Q 5/328; H01Q 5/335; H01Q 9/42; H01Q 1/242; H01Q 1/36; H01Q 1/48; H01Q 1/50; H01Q 1/52; H01Q 5/28; H01Q 5/50; H04B 1/006
See application file for complete search history.

(56) References Cited

U.S. PATENT DOCUMENTS

| | | | | |
|---|---|---|---|---|
| 11,342,653 | B2* | 5/2022 | Hsu ........................ | H01Q 1/243 |
| 11,349,199 | B2* | 5/2022 | Hsu ........................ | H01Q 1/243 |
| 2014/0218244 | A1* | 8/2014 | Chang .................... | H01Q 1/243 |
| | | | | 343/702 |
| 2016/0056531 | A1* | 2/2016 | Lee ........................ | H01Q 1/243 |
| | | | | 343/702 |

(Continued)

FOREIGN PATENT DOCUMENTS

| | | |
|---|---|---|
| CN | 205543232 U | 8/2016 |
| CN | 109921176 A | 6/2019 |

(Continued)

*Primary Examiner* — Hai V Tran
*Assistant Examiner* — Bamidele A Immanuel
(74) *Attorney, Agent, or Firm* — ScienBiziP, P.C.

(57) ABSTRACT

An antenna structure with wide radiation bandwidth in a reduced physical space includes a metallic housing, a first feed portion, and a second feed portion. The metallic housing includes a metallic side frame and a metallic back board. The metallic side frame defines a slot, and first and second gaps. The metallic side frame between the first gap and one end of the slot forms a first radiation portion. The second gap divides the first radiation portion into first and second radiation sections. The first feed portion feeds current and signal to the first radiation section, and the first radiation section works in a GPS mode and a WIFI 2.4 GHz mode. The second feed portion feeds current and signal to the second radiation section, and the second radiation section works in a WIFI 5 GHz mode.

14 Claims, 13 Drawing Sheets

(56) References Cited

U.S. PATENT DOCUMENTS

| | | | | |
|---|---|---|---|---|
| 2016/0149290 A1* | 5/2016 | Park | ............... | H01Q 1/44 |
| | | | | 343/702 |
| 2017/0033441 A1* | 2/2017 | Son | ............... | H01Q 5/328 |
| 2017/0047639 A1* | 2/2017 | Lee | ............... | H01Q 1/48 |
| 2017/0048363 A1* | 2/2017 | Lee | ............... | H01Q 5/314 |
| 2017/0170562 A1* | 6/2017 | Lee | ............... | H01Q 7/00 |
| 2017/0237150 A1* | 8/2017 | Soh | ............... | H01Q 5/371 |
| | | | | 343/702 |
| 2017/0244149 A1* | 8/2017 | Kim | ............... | H01Q 1/243 |
| 2017/0244163 A1* | 8/2017 | Yoo | ............... | H01Q 9/0442 |
| 2017/0244818 A1* | 8/2017 | Kim | ............... | H01Q 1/243 |
| 2017/0302771 A1* | 10/2017 | Kim | ............... | H01Q 9/42 |
| 2018/0026334 A1* | 1/2018 | Chen | ............... | H01Q 5/371 |
| | | | | 343/702 |
| 2018/0026336 A1* | 1/2018 | Chen | ............... | H04Q 1/48 |
| | | | | 343/702 |
| 2018/0026343 A1* | 1/2018 | Lee | ............... | H01Q 1/521 |
| | | | | 343/702 |
| 2018/0026344 A1* | 1/2018 | Lee | ............... | H01Q 1/243 |
| | | | | 343/702 |
| 2018/0026353 A1* | 1/2018 | Tseng | ............... | H01Q 5/10 |
| | | | | 455/575.7 |
| 2018/0026360 A1* | 1/2018 | Lee | ............... | H01Q 9/14 |
| | | | | 343/872 |
| 2018/0026370 A1* | 1/2018 | Lee | ............... | H01Q 1/243 |
| | | | | 343/810 |
| 2018/0062244 A1* | 3/2018 | Huang | ............... | H01Q 5/371 |
| 2018/0248250 A1* | 8/2018 | Hsu | ............... | H01Q 13/10 |
| 2018/0248264 A1* | 8/2018 | Chen | ............... | H01Q 9/40 |
| 2019/0044218 A1* | 2/2019 | Ye | ............... | H01Q 5/50 |
| 2019/0131694 A1* | 5/2019 | Lee | ............... | H01Q 1/243 |
| 2019/0181554 A1* | 6/2019 | Lee | ............... | H01Q 13/10 |
| 2019/0181555 A1 | 6/2019 | Lee et al. | | |
| 2019/0372223 A1* | 12/2019 | Hsu | ............... | H01Q 1/241 |
| 2020/0373669 A1* | 11/2020 | Xue | ............... | H01Q 1/243 |
| 2021/0151886 A1* | 5/2021 | Wang | ............... | H01Q 5/35 |
| 2021/0210837 A1* | 7/2021 | Hsu | ............... | H01Q 1/42 |
| 2022/0037764 A1* | 2/2022 | Hsu | ............... | H01Q 21/30 |

FOREIGN PATENT DOCUMENTS

CN            110661084 A     1/2020
WO    WO-2018232678 A1 * 12/2018           H01Q 1/242

* cited by examiner

ANTENNA STRUCTURE AND WIRELESS COMMUNICATION DEVICE USING SAME

FIELD

The subject matter herein generally relates to wireless communications, to an antenna structure, and to a wireless communication device using the antenna structure.

BACKGROUND

Antennas are for receiving and transmitting wireless signals at different frequencies. However, the antenna structure is complicated and occupies a large space in a wireless communication device, which makes miniaturization of the wireless communication device problematic.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
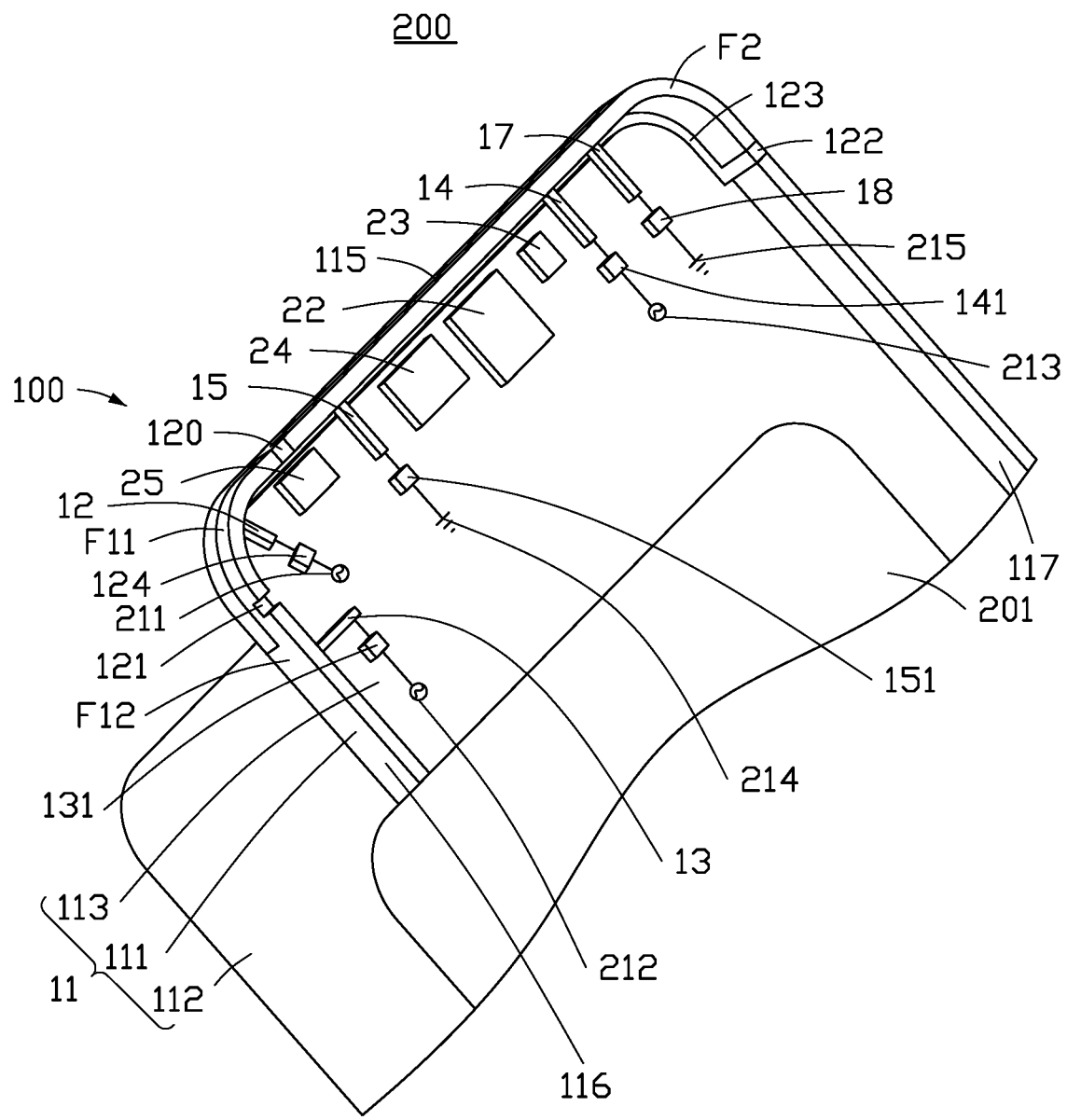
FIG. 1 is a schematic diagram of an embodiment of a wireless communication device including an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

Figure 2:
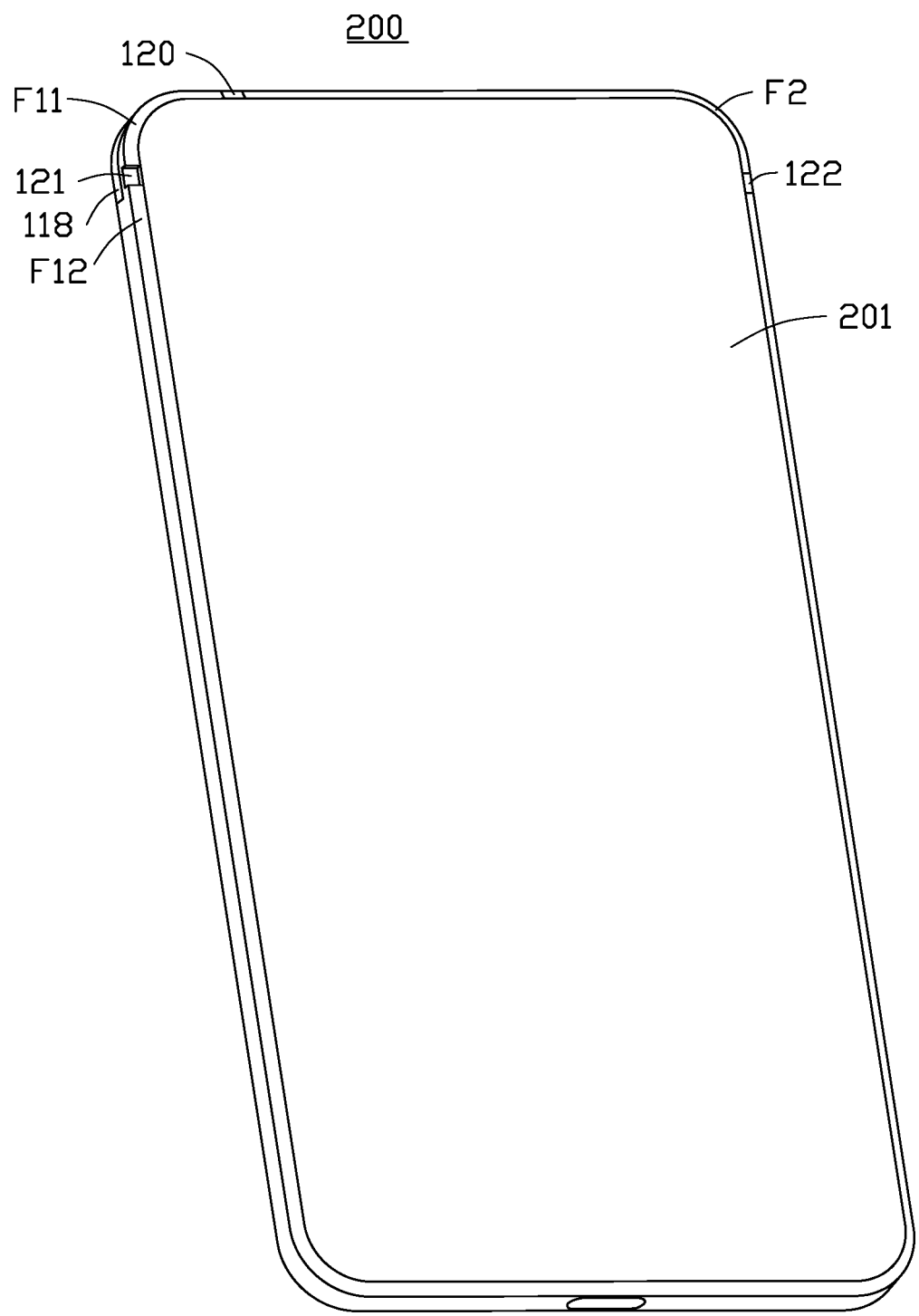
FIG. 2 is an assembled, isometric view of the wireless communication device of FIG. 1.

FIG. 1 and FIG. 2 illustrate an embodiment of a wireless communication device 200 using an antenna structure 100. The wireless communication device 200 can be, for example, a mobile phone or a personal digital assistant. The antenna structure 100 can transmit and receive radio waves, to exchange wireless signals. FIG. 1 is a schematic diagram of the antenna structure 100 applied to the wireless communication device 200. FIG. 2 is a diagram of the assembled wireless communication device 200.

The antenna structure 100 includes a metallic housing 11, a first feed portion 12, a second feed portion 13, a third feed portion 14, a first ground portion 15, a second ground portion 17, and a switch circuit 18.

The metallic housing 11 at least includes a metallic side frame 111, a metallic back board 112, and a metallic middle frame 113. The metallic side frame 111 is substantially a ring structure. The metallic side frame 111 is made of metal or other conductive materials. The metallic back board 112 is positioned at a periphery of the metallic side frame 111. In this embodiment, an opening (not shown) is defined on a side of the metallic side frame 111 away the metallic back board 112, for receiving a display unit 201 of the wireless communication device 200. The display unit 201 has a display plane, and the display plane is exposed through the opening.

The metallic middle frame 113 is substantially a rectangular sheet. The metallic middle frame 113 is made of metal or other conductive materials. The metallic middle frame 113 is a metal sheet located between the display unit 201 and the metallic back board 112. The metallic middle frame 113 is used to support the display unit 201, provide electromagnetic shielding, and improve mechanical strength of the wireless communication device 200. In this embodiment, the metallic side frame 111, the metallic back board 112, and the metallic middle frame 113 form an integral metal structure.

In this embodiment, the display unit 201 has a high screen-to-body ratio. That is, an area of the display plane of the display unit 201 is greater than 70% of a frontal area of the wireless communication device 200, and even a full front screen (approximately 100%) can be achieved. In this embodiment, the full screen refers to a slot other than the necessary slot defined in the antenna structure 100, so the left, the right, and the lower sides of the display unit 201 can be connected to the metallic side frame 111 seamlessly.

In this embodiment, the metallic side frame 111 at least includes an end portion 115, a first side portion 116, and a second side portion 117. The end portion 115 is a top end of the wireless communication device 200. That is, the antenna structure 100 constitutes an upper antenna of the wireless communication device 200. The first side portion 116 and the second side portion 117 are positioned opposite to each other. The first side portion 116 and the second side portion 117 are each disposed at one end of the end portion 115, and are preferably disposed vertically.

The metallic housing 11 defines a slot 118 and at least one gap. The slot 118 is defined on the metallic side frame 111. The slot 118 is substantially U-shaped, and is defined at the end portion 115 extending towards the first side portion 116 and the second side portion 117. In this embodiment, the slot 118 is defined on a location of the metallic side frame 111 close to the metallic back board 112, and extends toward the display unit 201. In this embodiment, a width of the slot 118 is approximately half of a width of the metallic side frame 111. That is, the slot 118 is defined on a side of the metallic side frame 111 close to the metallic back board 112 and extends away from the metallic back board 112 to the middle of the metallic side frame 111.

In this embodiment, the metallic housing 11 defines three gaps, namely a first gap 120, a second gap 121, and a third gap 122. The first gap 120, the second gap 121, and the third gap 122 are defined on the metallic side frame 111. In detail, the first gap 120 is defined at the end portion 115 and positioned near the first side portion 116. The second gap 121 is spaced from the first gap 120. The second gap 121 is defined at the first side portion 116 and positioned near the end portion 115. That is, the first gap 120 and the second gap 121 are defined (according to FIG. 2) at top left corner of the metallic housing 11. The third gap 122 is spaced from the first gap 120. The third gap 122 is defined at the second side portion 117 and positioned near the end portion 115. As FIG. 2 shows, the third gap 122 is defined at top right corner of the metallic housing 11.

In this embodiment, the first gap 120 and the third gap 122 all penetrate and interrupt the metallic side frame 111, and communicate with the slot 118. In this embodiment, the second gap 121 is defined at the metallic side frame 111 and extends along a direction toward the metallic back board 112 (or the slot 118). That is, the second gap 121 is a virtual gap, which is not in communication with the slot 118.

The slot 118 and the at least one gap cooperatively divide the metallic housing 11 into at least two radiation portions. In this embodiment, the slot 118, the first gap 120, the second gap 121, and the third gap 122 divide the metallic housing 11 into two radiation portions, namely a first radiation portion F1 and a second radiation portion F2. In this embodiment, the metallic side frame 111 between the first gap 120 and an end of the slot 118 at the first side portion 16 forms the first radiation portion F1. The metallic side frame 111 between the first gap 120 and the third gap 122 forms the second radiation portion F2.

In this embodiment, the second gap 121 further divides the first radiation portion F1 into two portions, namely a first radiation section F11 and a second radiation section F12. The metallic side frame 111 between the first gap 120 and the second gap 121 forms the first radiation section F11. The metallic side frame 111 between the second gap 121 and an end of the first side portion 16 corresponding to the slot 118 forms the second radiation section F12. In this embodiment, because the second gap 121 is a virtual gap, the first radiation section F11 and the second radiation section F12 are not insulated from each other. That is, the first radiation section F1*l* is still connected to the second radiation section F12.

In this embodiment, a notch 123 is defined on the side of the metallic middle frame 113 near the end portion 115. The notch 123 is substantially U-shaped. That is, the notch 123 is defined in the portion of the metallic middle frame 113 corresponding to the end portion 115, and extends along the metallic middle frame 113 and is parallel to the first side portion 116 and the second side portion 117. Then, the notch 123 is substantially parallel to the slot 118 and communicates with the slot 118, the first gap 120, and the third gap 122.

In this embodiment, one side of the first radiation portion F1 near an end of the slot 118 located at the first side portion 116 is connected to the metallic middle frame 113 and the metallic back board 113, namely, it is grounded. The second radiation portion F2 is spaced apart from and insulated from the metallic middle frame 113. That is, the slot 118 and the notch 123 separate the radiator of the metallic side frame (that is, the second radiation portion F2,) and the metallic back board 112.

In this embodiment, the first gap 120, the second gap 121, and the third gap 122 have the same width. The width of each of the first gap 120, the second gap 121, and the third gap 122 is 1-2 mm.

In this embodiment, the slot 118, the first gap 120, and the second gap 121, the third gap 122, and the notch 123 are all filled with an insulating material (such as plastic, rubber, glass, wood, ceramic, etc., not being limited to these).

Figure 3:
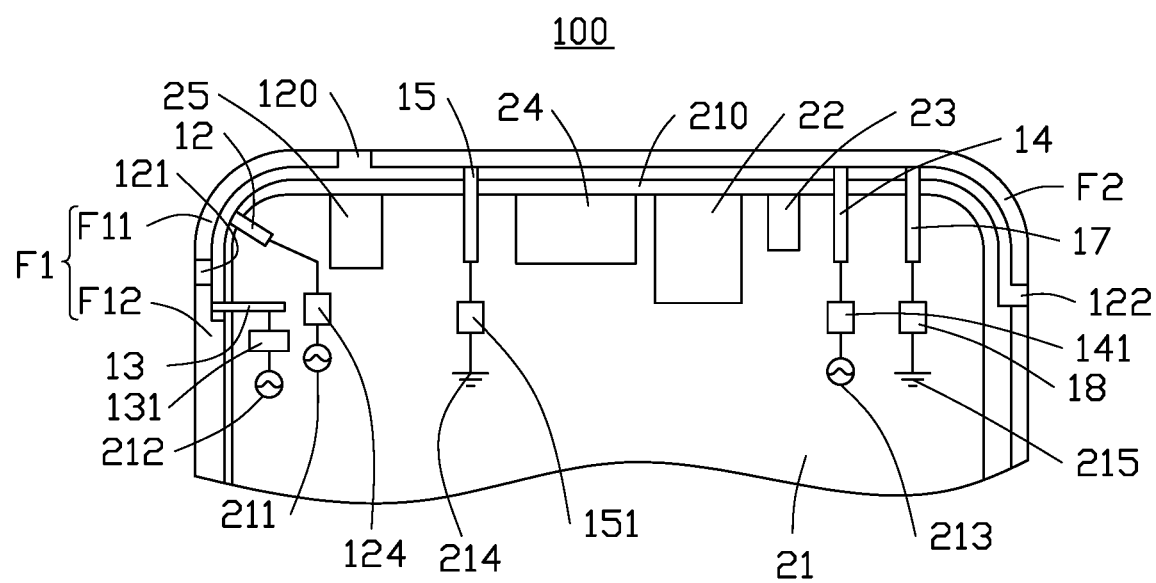
FIG. 3 is a circuit diagram of the antenna structure of FIG. 1.

As illustrated in FIG. 3, the wireless communication device 200 further includes a circuit board 21 and at least one electronic component. In this embodiment, the circuit board 21 is received in a space formed by the metallic side frame 111, the metallic middle frame 113, and the metallic back board 112. One end of the circuit board 21 is spaced apart from the metallic side frame 111, thus a headroom 210 is formed between the circuit board 21 and the metallic side frame 111.

In this embodiment, the circuit board 21 includes a first feed point 211, a second feed point 212, a third feed point 213, a first ground point 214, and a second ground point 215. The first feed point 211, the second feed point 212, the third feed point 213, the first ground point 214, and the second ground point 215 are spaced apart from each other. The first feed point 211, the second feed point 212, the third feed point 213 feed current and signals to the antenna structure 100. The first ground point 214 and the second ground point 215 ground the antenna structure 100.

In this embodiment, the wireless communication device 200 includes at least four electronic components, namely first to fourth electronic components 22-25. The first to fourth electronic components 22-25 are located at a same side of the circuit board 21 near the end portion 115.

In this embodiment, the first electronic component 22 is a front lens module. The first electronic component 22 is positioned on an edge of the circuit board 21 adjacent to the second radiation portion F2. The first electronic component 22 is positioned so as to be insulated by the slot 118 from the second radiation portion F2.

The second electronic component 23 is a proximity sensor. The second electronic component 23 is positioned on the circuit board 21 and is spaced apart from the first electronic component 22.

The third electronic component 24 is a receiver. The third electronic component 24 is positioned on the circuit board 21 and is positioned at one side of the first electronic component 22 near the first gap 120. In this embodiment, the second electronic component 23 and the third electronic component 24 are also spaced and insulated by the slot 118 from the second radiation portion F2.

The fourth electronic component 25 is an audio output interface. The fourth electronic component 25 is positioned on the circuit board 21. The fourth electronic component 25 is positioned on a side of the third electronic component 24 away from the first electronic component 22. The fourth electronic component 25 is positioned to correspond to the first gap 120.

In this embodiment, the metallic side frame 111 further defines an earphone hole (not shown). The earphone hole is defined on the end portion 115. The earphone hole is positioned to correspond to the fourth electronic component 25. In this way, an external device, such as an earphone, can be inserted through the earphone hole to establish an electrical connection with the fourth electronic component 25.

In this embodiment, the first feed portion 12 is positioned in the metallic housing 11. One end of the first feed portion 12 may be electrically connected to the first radiation section F11 by means of an elastic sheet, a microstrip line, a strip line, or a coaxial cable. The other end of the first feed portion 12 is electrically connected to the first feed point 211 through a matching circuit 124, to feed current and signals to the first radiation section F11 of the first radiation portion F1.

The second feed portion 13 is positioned in the metallic housing 11. One end of the second feed portion 13 may be electrically connected to the second radiation section F12 by means of an elastic sheet, a microstrip line, a strip line, or a coaxial cable. The other end of the second feed portion 13 is electrically connected to the second feed point 212 through a matching circuit 131, to feed current and signals to the second radiation section F12 of the first radiation portion F1.

In this embodiment, the third feed portion 14 is positioned in the metallic housing 11. One end of the third feed portion 14 is electrically connected to one end of the second radiation portion F2 near the third gap 122 by means of an elastic sheet, a microstrip line, a strip line, or a coaxial cable. The other end of the third feed portion 14 is electrically connected to the third feed point 213 through a matching circuit 141, to feed current and signals to the second radiation portion F2.

In this embodiment, the first feed portion 12, the second feed portion 13, and the third feed portion 14 may be made of iron, copper foil, or a conductor in a laser direct structuring (LDS) process.

In this embodiment, the first ground portion 15 is positioned in the metallic housing 11 between the third electronic element 24 and the fourth electronic element 25. One end of the first ground portion 15 may be electrically connected to the second radiation portion F2. The other end of the first ground portion 15 is electrically connected to the first ground point 214 through a matching circuit 151, to ground the first radiation portion F1.

In this embodiment, the matching circuits 124, 131, 141, and 151 may be L-shaped matching circuits, T-shaped matching circuits, π-shaped matching circuits, or other arrangement of capacitors and inductors to adjust the impedance matching of corresponding radiation portion or radiation section. For example, the impedance matching of the first radiation section F11, the second radiation section F12, and the second radiation section F2 is adjusted.

In this embodiment, the second ground portion 17 is positioned in the metallic housing 11 between the third feed portion 14 and the second side portion 117. One end of the second ground portion 17 may be electrically connected to one end of the second radiation portion F2 near the third gap 122. The other end of the second ground portion 17 is electrically connected to the second ground point 215 through the switch circuit 18, to ground the second radiation portion F2.

Figure 4:
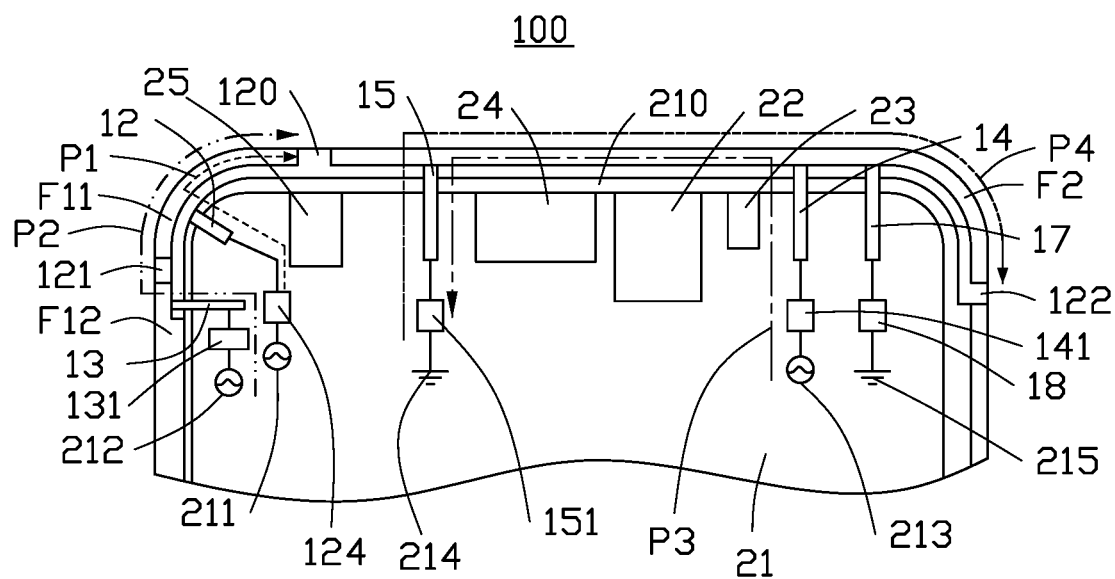
FIG. 4 is a current path distribution graph of the antenna structure of FIG. 3.

FIG. 4 illustrates a diagram of current paths of the antenna structure 100. When the first feed portion 12 supplies a current, the current flows through the first radiation section F11 of the first radiation portion F1, toward the first gap 120 (path P1), to excite a first working mode and generate a radiation signal in a first radiation frequency band.

When the second feed portion 13 supplies a current, the current will flow through the second radiation section F12 of the first radiation portion F1 and the first radiation section F11, toward the first gap 120 (path P2), to excite a second working mode and generate a radiation signal in a second radiation frequency band.

When the third feed portion 14 supplies a current, the current will flow through the second radiation portion F2, toward the first gap 120, and is grounded through the first ground portion 15 and the matching circuit 151 (path P3), to excite a third working mode and generate a radiation signal in a third radiation frequency band.

When the third feed portion 14 supplies a current, the current also flows through the first ground portion 15 through the first ground point 214, flows through the second radiation portion F2 toward the third gap 122 (path P4), to excite a fourth working mode and generate a radiation signal in a fourth radiation frequency band.

In this embodiment, the first working mode includes a global positioning system (GPS) mode and a WIFI 2.4 GHz mode. The second working mode is a WIFI 5 GHz mode. The third working mode includes a Long Term Evolution Advanced (LTE-A) middle frequency mode and an LTE-A high frequency mode. The fourth working mode is an LTE-A low frequency mode. The frequencies of the first radiation frequency band include 1575 MHz and 2400-2484 MHz. The frequencies of the second radiation frequency band are 5150-5850 MHz. The frequencies of the third radiation frequency band include 1710-2170 MHz and 2300-2690 MHz. The frequencies of the fourth radiation frequency band are 700-960 MHz.

Figure 5:
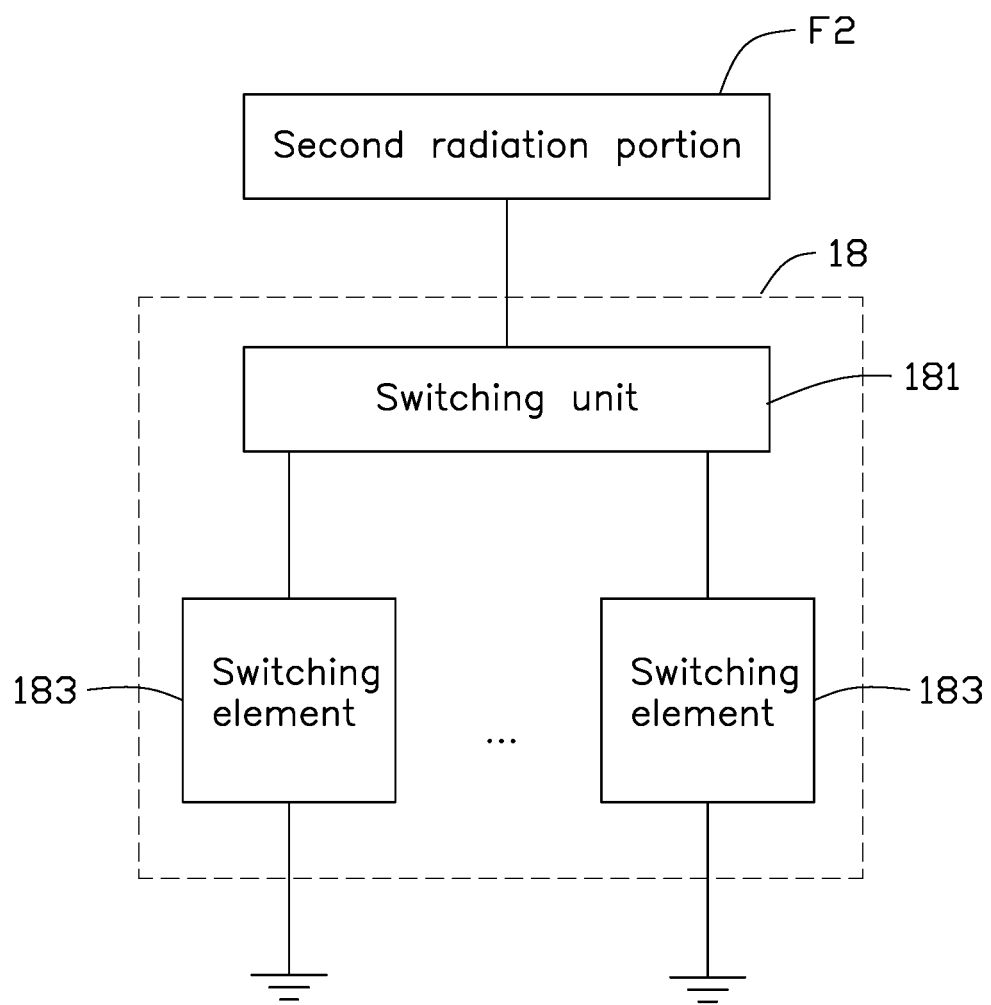
FIG. 5 is a circuit diagrams of a switch circuit of the antenna structure of FIG. 3.

As illustrated in FIG. 5, the switch circuit 18 includes a switching unit 181 and a plurality of switching elements 183. The switching unit 181 may be a single pole single throw switch, a single pole double throw switch, a single pole three throw switch, a single pole four throw switch, a single pole six throw switch, a single pole eight throw switch, or the like. The switching unit 181 is electrically connected to the second radiation portion F2. The switching elements 183 can be inductors, capacitors, or a combination of them. The switching elements 183 are connected in parallel to each other. One end of each switching element 183 is electrically connected to the switching unit 181. The other end of each switching element 183 is electrically connected to the second ground point 215, namely, grounded. The switching unit 181 can switch the second radiation portion F2 to connect with different switching elements 183, for adjusting the fourth radiation frequency band, that is, the frequencies of the low frequency band.

Figure 6:
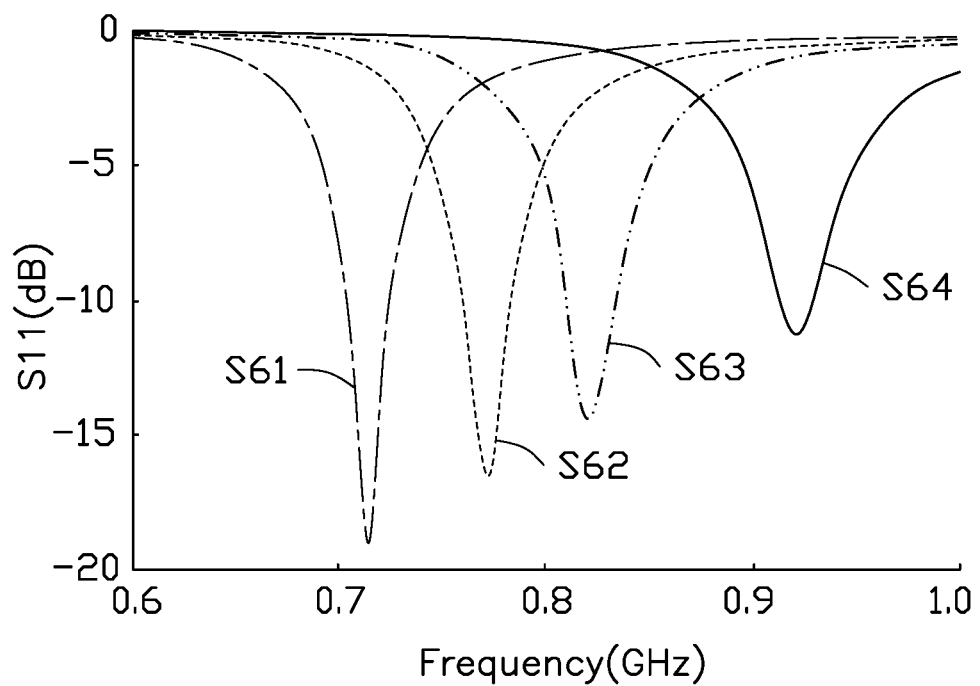
FIG. 6 is a scattering parameter graph when the antenna structure of FIG. 4 works in a Long Term Evolution Advanced (LTE-A) low frequency mode.

FIG. 6 is a graph of scattering parameters (S parameters) when the antenna structure 100 works in the LTE-A low frequency mode. A curve S61 is an S11 value when the antenna structure 100 works in the frequency band of LTE-A Band17 (704-746 MHz). A curve S62 is an S11 value when the antenna structure 100 works in the frequency band of LTE-A Band13 (746-787 MHz). A curve S63 is an S11 value when the antenna structure 100 works in the frequency band of LTE-A Band5 (869-894 MHz). A curve S64 is an S11 value when the antenna structure 100 works in the frequency band of LTE-A Band8 (880-960 MHz).

Figure 7:
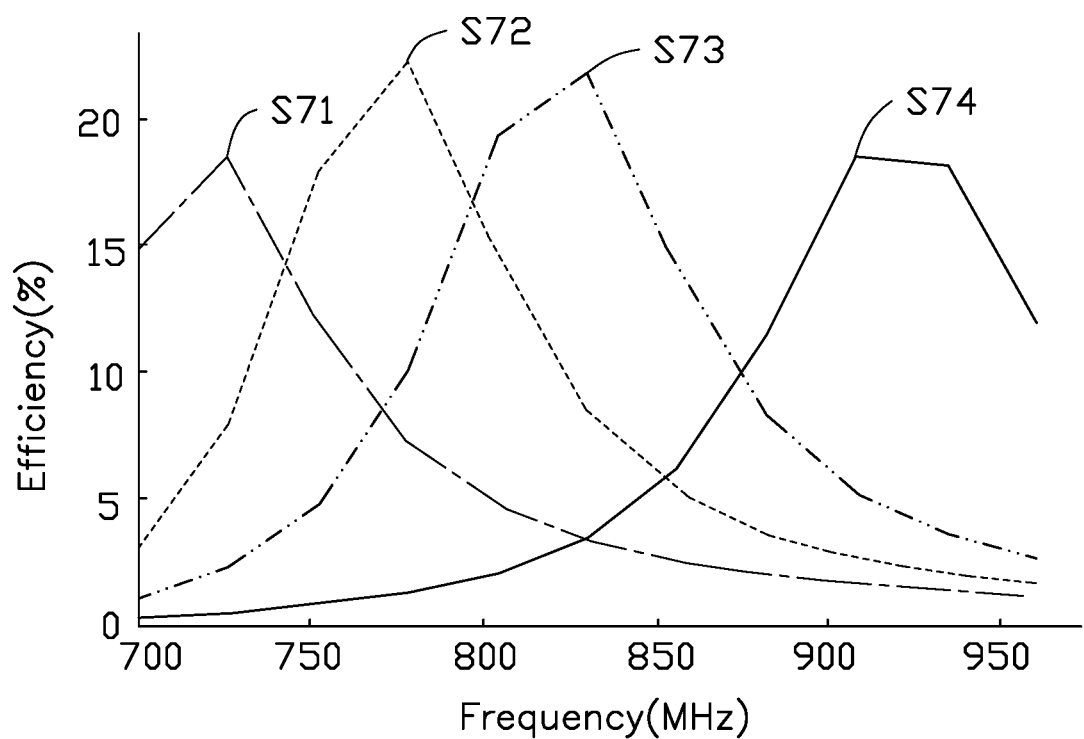
FIG. 7 is a radiation efficiency graph when the antenna structure of FIG. 4 works in LTE-A low frequency mode.

FIG. 7 is a graph of the radiation efficiency when the antenna structure 100 works in the LTE-A low frequency mode. A curve S71 is a radiation efficiency when the antenna structure 100 works in the frequency band of LTE-A Band17 (704-746 MHz). A curve S72 is a radiation efficiency when the antenna structure 100 works in the frequency band of LTE-A Band13 (746-787 MHz). A curve S73 is a radiation efficiency value when the antenna structure 100 works in the frequency band of LTE-A Band5 (869-894 MHz). A curve S74 is a radiation efficiency when the antenna structure 100 works in the frequency band of LTE-A Band8 (880-960 MHz).

Figure 8:
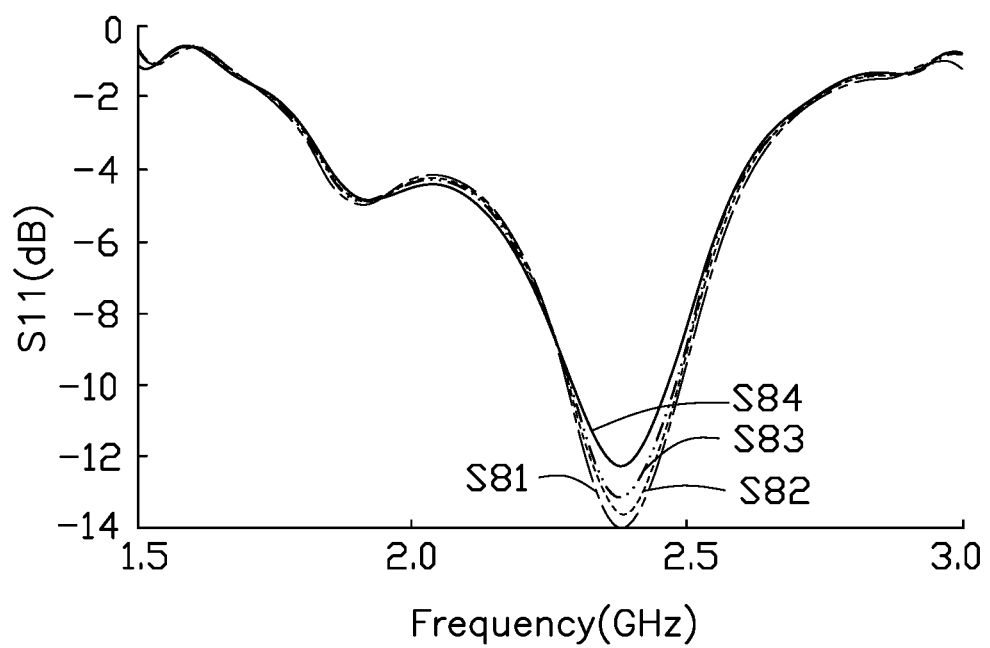
FIG. 8 is a scattering parameter graph when the antenna structure of FIG. 4 works in LTE-A middle and high frequency modes.

FIG. 8 is a graph of scattering parameters (S parameters) when the antenna structure 100 works in the LTE-A middle and high frequency modes. A curve S81 is an S11 value when the low frequency of the antenna structure 100 is LTE-A Band17 (704-746 MHz), and the antenna structure 100 works in the LTE-A middle and high frequency bands. A curve S82 is an S11 value when the low frequency of the antenna structure 100 is LTE-A Band13 (746-787 MHz), and the antenna structure 100 works in the LTE-A middle and high frequency bands. A curve S83 is an S11 value when the low frequency of the antenna structure 100 is LTE-A Band5 (869-894 MHz), and the antenna structure 100 works in the LTE-A middle and high frequency bands. A curve S64 is an S11 value when the low frequency of the antenna structure 100 is LTE-A Band8 (880-960 MHz), and the antenna structure 100 works in the LTE-A middle and high frequency bands.

Figure 9:
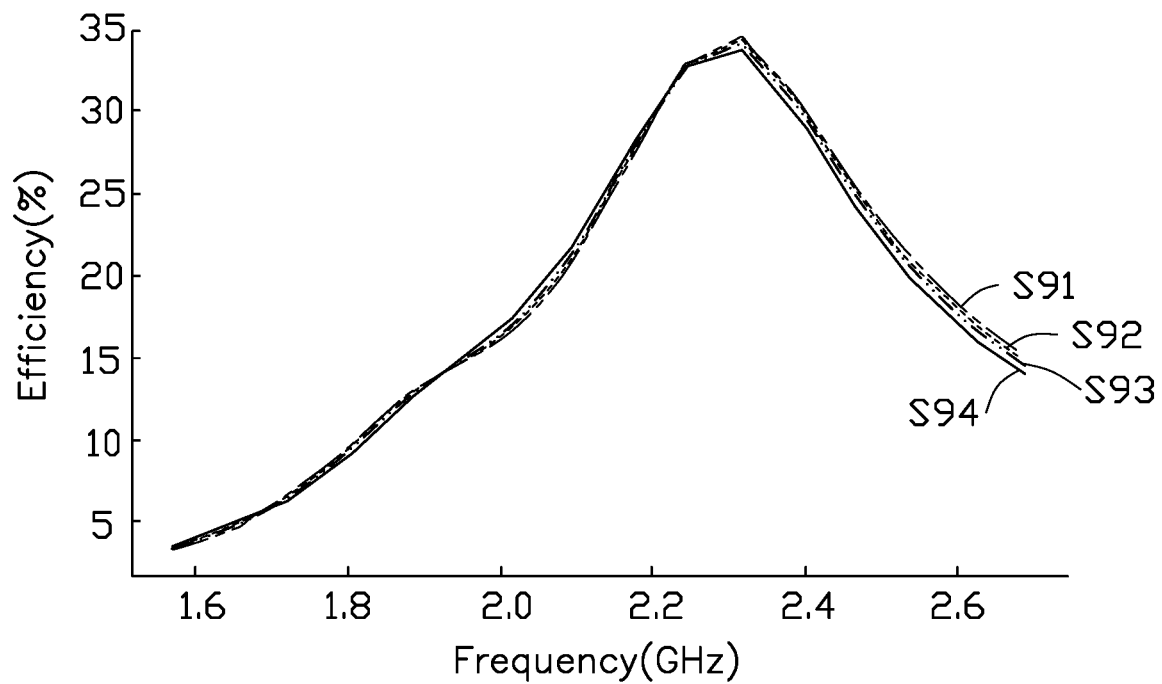
FIG. 9 is a radiation efficiency graph when the antenna structure of FIG. 4 works in LTE-A middle and high frequency modes.

FIG. 9 is a graph of the radiation efficiency when the antenna structure 100 works in the LTE-A middle and high frequency modes. A curve S91 is a radiation efficiency value when the low frequency of the antenna structure 100 is LTE-A Band17 (704-746 MHz), and the antenna structure 100 works in the LTE-A middle and high frequency bands. A curve S92 is a radiation efficiency value when the low frequency of the antenna structure 100 is LTE-A Band13 (746-787 MHz), and the antenna structure 100 works in the LTE-A middle and high frequency bands. A curve S93 is a radiation efficiency value when the low frequency of the antenna structure 100 is LTE-A Band5 (869-894 MHz), and the antenna structure 100 works in the LTE-A middle and high frequency bands. A curve S94 is a radiation efficiency value when the low frequency of the antenna structure 100 is LTE-A Band8 (880-960 MHz), and the antenna structure 100 works in the LTE-A middle and high frequency bands.

Figure 10:
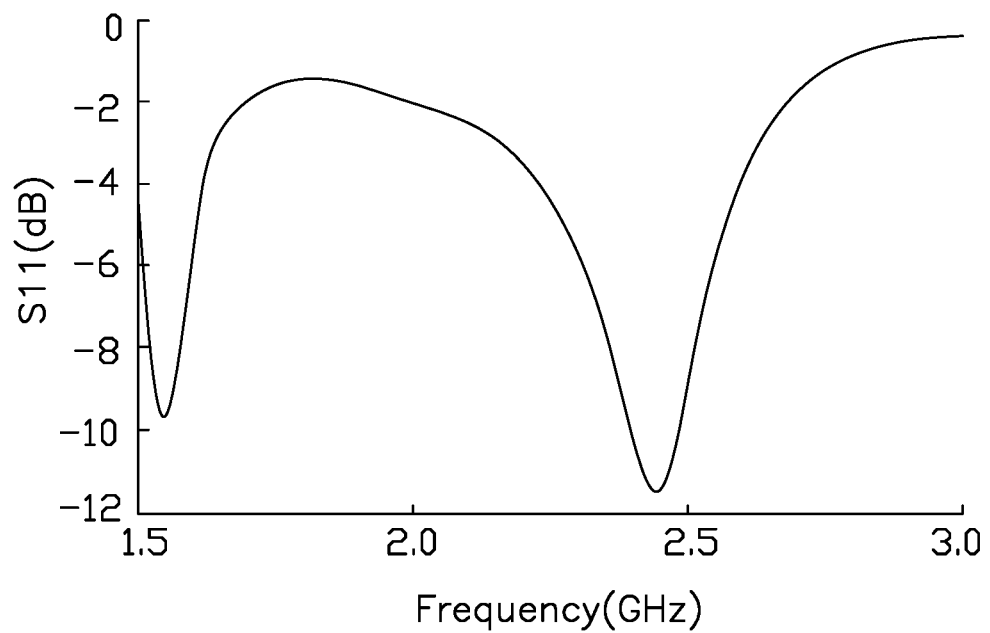
FIG. 10 is a scattering parameter graph when the antenna structure of FIG. 4 works in a Global Positioning System (GPS) mode and a WIFI 2.4 GHz mode.
Figure 11:
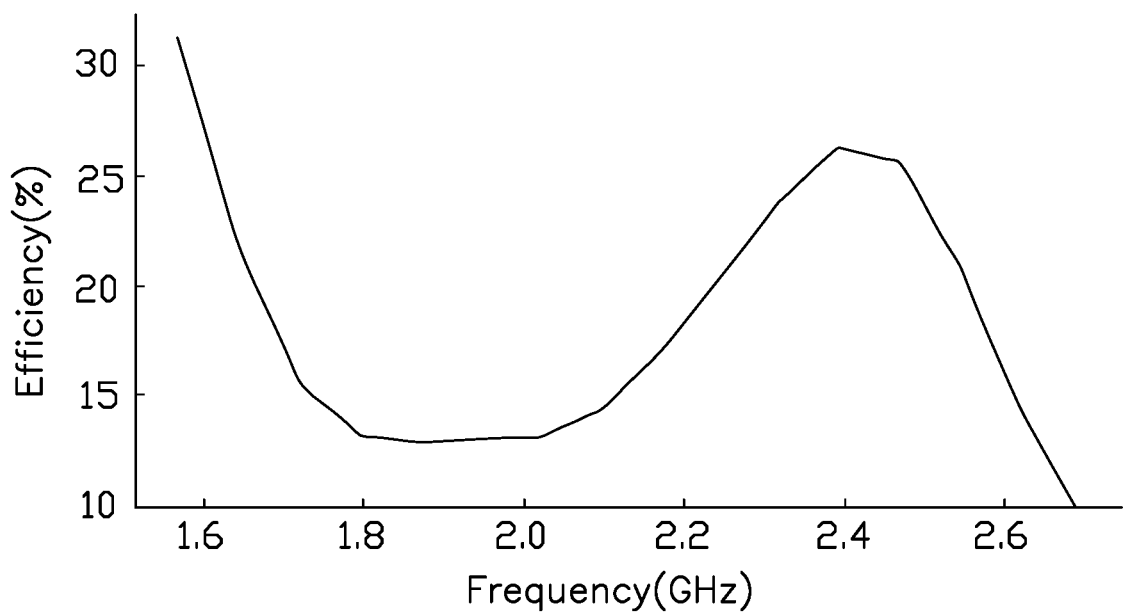
FIG. 11 is a radiation efficiency graph when the antenna structure of FIG. 4 works in GPS mode and WIFI 2.4 GHz mode.

FIG. 10 is a graph of scattering parameters (S parameters) when the antenna structure 100 works in the GPS mode and the WIFI 2.4 GHz mode. FIG. 11 is a graph of the radiation efficiency when the antenna structure 100 works in the GPS mode and the WIFI 2.4 GHz mode.

Figure 12:
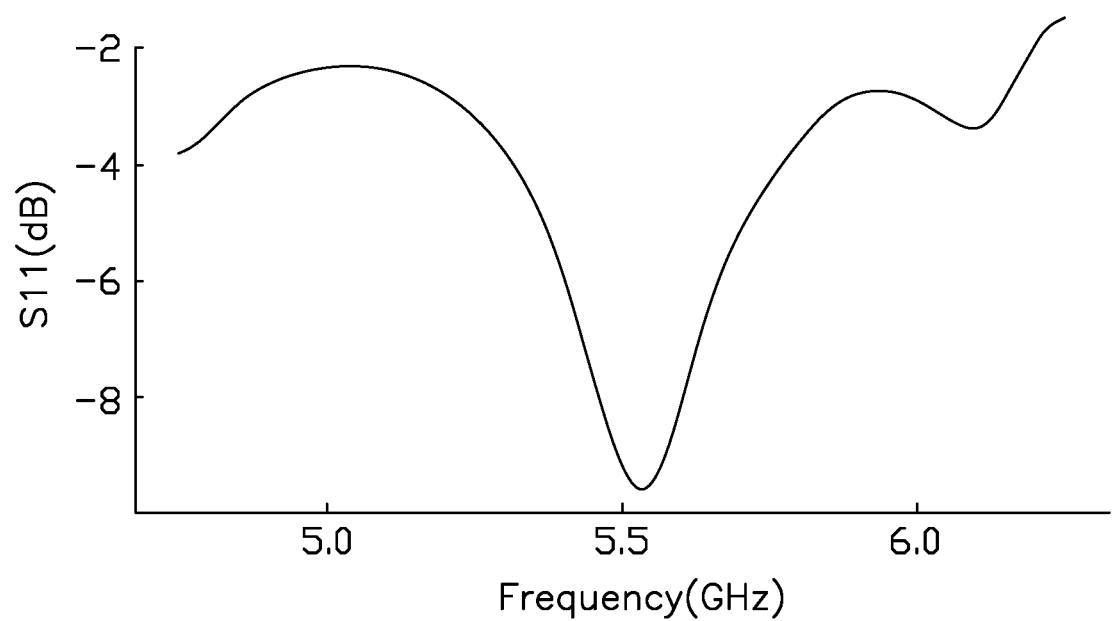
FIG. 12 is a scattering parameter graph when the antenna structure of FIG. 4 works in a WIFI 5 GHz mode.
Figure 13:
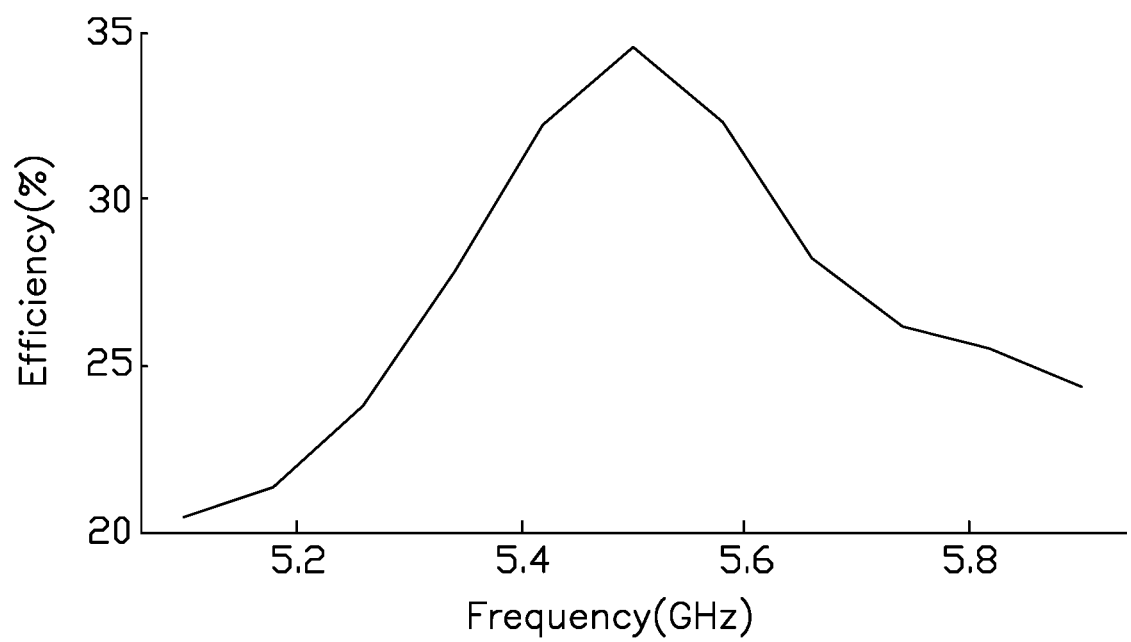
FIG. 13 is a radiation efficiency graph when the antenna structure of FIG. 4 works in WIFI 5 GHz mode.

FIG. 12 is a graph of scattering parameters (S parameters) when the antenna structure 100 works in the WIFI 5 GHz mode. FIG. 13 is a graph of total radiation efficiency when the antenna structure 100 works in the WIFI 5 GHz mode.

FIG. 6 to FIG. 113 show that the antenna structure 100 is provided with the switch circuit 18, to switch between various low frequency modes of the antenna structure 100. This improves the low frequency bandwidth and gives better antenna effectiveness. Furthermore, when the antenna structure 100 works in the frequency bands of LTE-A Band17 (704-746 MHz), LTE-A Band13 (746-787 MHz), LTE-A Band5 (869-894 MHz), and LTE-A Band8 (880-960 MHz), the LTE-A middle and high frequency bands are all about 1710-2690 MHz, and the antenna structure 100 can also cover frequency bands of GPS, WIFI 2.4 GHz, and WIFI 5 GHz. That is, when the switch circuit 18 is switched across, the switch circuit 18 is only used to change the low frequency mode of the antenna structure 100 without affecting the middle and high frequency modes. This feature is good for a carrier aggregation application (CA) of LTE-A.

The antenna structure 100 can generate various working modes through the switching of the switch circuit 18, such as low frequency mode, middle frequency mode, high frequency mode, GPS mode, WIFI 2.4 GHz mode, and WIFI 5 GHz mode, so that communication bands commonly used in the world are covered. Specifically, the antenna structure 100 can cover GSM850/900/WCDMA Band5/Band8/Band13/Band17 at low frequencies, GSM 1800/1900/WCDMA 2100 (1710-2170 MHz) at middle frequencies, LTE-A Band1, Band40, Band41 (2300-2690 MHz) at high frequencies, and frequency bands of GPS, WIFI 2.4 GHz, and WIFI 5 GHz. The frequency bands of the antenna structure 100 can be applied to the operation of GSM Qual-band, UMTS Band I/II/V/VIII frequency bands, and LTE 850/900/1800/1900/2100/2300/2500 frequency bands, as commonly used worldwide.

The antenna structure 100 sets at least one gap (such as the first gap 120, the second gap 121, and the third gap 122) on the metallic side frame 111 to create at least two radiation portions from the metallic side frame 111. The antenna structure 100 further includes the switch circuit 18. Therefore, it can cover multiple frequency bands, such as, low frequency, middle frequency, high frequency, and frequency bands of GPS, WIFI 2.4 GHz, and WIFI 5 GHz through different switching methods, and renders radiation capabilities of the antenna structure 100 more effective in broadband ranges compared to a general metal backing. The antenna structure 100 increases the low frequency bandwidth and provides better antenna efficiency, covering the requirements of global frequency band applications and supporting CA. In addition, the antenna structure 100 has a full front screen, and the antenna structure 100 still has good performance in the less-than-optimal environment of the metallic back board 112, the metallic side frame 111, and a large area of grounded metal around it.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure, applied to a wireless communication device having a full front screen, the antenna structure comprising:

a metallic housing, the metallic housing comprising a metallic side frame and a metallic back board, the metallic side frame positioned at a periphery of the metallic back board, wherein the metallic side frame defines a slot, a first gap, and a second gap, the first gap is communicated with the slot, the metallic side frame between the first gap and one end of the slot forms a first radiation portion, the second gap is defined on the metallic side frame between the first gap and the other end of the slot, and divides the first radiation portion into a first radiation section and a second radiation section, the first radiation section is connected to the second radiation section; wherein the metallic side frame defines a third gap, and the metallic side frame between the first gap and the third gap forms a second radiation portion;

a first feed portion, the first feed portion electrically connected to the first radiation section for feeding current and signal to the first radiation section, and the first radiation section working in a GPS mode and a WIFI 2.4 GHz mode;

a second feed portion, the second feed portion be electrically connected to the second radiation section for feeding current and signal to the second radiation section, and the second radiation section working in a WIFI 5 GHz mode;

a third feed portion, a first ground portion, and a second ground portion, wherein the third feed portion is electrically connected to the second radiation portion for feeding current and signal to the second radiation portion, a first end of the first ground portion is electrically connected to a first end of the second radiation portion near the first gap, a first end of the second ground portion is electrically connected to a second end of the second radiation portion near the third gap, a second end of the first ground portion and a second end of the second ground portion are both grounded;

wherein when the first feed portion supplies current, the current flows through the first radiation section, toward the first gap, to excite the GPS mode and the WIFI 2.4 GHz mode; wherein when the second feed portion supplies current, the current flows through the second radiation section and the first radiation section, toward the first gap, to excite the WIFI 5 GHz mode; wherein when the third feed portion supplies current, the current flows through the second radiation portion, toward the first gap, and is grounded through the first ground portion, to excite LTE-A middle and high frequency modes; wherein when the third feed portion supplies current, the current flows to the second radiation portion through the first ground portion, toward the third gap, to excite an LTE-A low frequency mode.

2. The antenna structure of claim 1, wherein the metallic side frame comprises an end portion, a first side portion, and a second side portion, the first side portion and the second side portion are respectively connected to one end of the end portion, the slot is defined on the end portion and extends in directions toward the first side portion and the second side portion, the first gap is defined on the end portion near the first side portion;

wherein the second gap is defined on the first side portion near the end portion, extends along a direction toward the metallic back board, the second gap is not communicated with the slot, the first radiation section and the second radiation section are connected with each other.

3. The antenna structure of claim 2, wherein the third gap is defined on the second side portion near the end portion, the third gap is communicated with the slot.

4. The antenna structure of claim 3, further comprising a switch circuit, wherein one end of the switch circuit is electrically connected to the second ground portion, another end of the switch circuit is grounded to adjust a frequency of the LTE-A low frequency mode.

5. The antenna structure of claim 2, wherein the slot is defined on a location of the metallic side frame near the metallic back board, extends along a direction toward the full front screen, a width of the slot is half of a width of the metallic side frame.

6. The antenna structure of claim 2, further comprising a metallic middle frame, wherein the metallic middle frame is positioned in the metallic housing, a location of the metallic middle frame near the end portion defines a notch, the notch is communicated with the slot.

7. The antenna structure of claim 6, wherein the wireless communication device further comprises a circuit board, the circuit board is received in a space formed by the metallic side frame, the metallic back board, and the metallic middle frame, one end of the circuit board is spaced apart from the metallic side frame, and a headroom is formed between the circuit board and the metallic side frame.

8. A wireless communication device, comprising:
a full front screen; and
an antenna structure comprising:
a metallic housing, the metallic housing comprising a metallic side frame and a metallic back board, the metallic side frame positioned at a periphery of the metallic back board, wherein the metallic side frame defines a slot, a first gap, and a second gap, the first gap is communicated with the slot, the metallic side frame between the first gap and one end of the slot forms a first radiation portion, the second gap is defined on the metallic side frame between the first gap and the other end of the slot, and divides the first radiation portion into a first radiation section and a second radiation section, the first radiation section is connected to the second radiation section; wherein the metallic side frame defines a third gap, and the metallic side frame between the first gap and the third gap forms a second radiation portion;
a first feed portion, the first feed portion electrically connected to the first radiation section for feeding current and signal to the first radiation section, and the first radiation section working in a GPS mode and a WIFI 2.4 GHz mode;
a second feed portion, the second feed portion be electrically connected to the second radiation section for feeding current and signal to the second radiation section, and the second radiation section working in a WIFI 5 GHz model;
a third feed portion, a first ground portion, and a second ground portion, wherein the third feed portion is electrically connected to the second radiation portion for feeding current and signal to the second radiation portion, a first end of the first ground portion is electrically connected to a first end of the second radiation portion near the first gap, a first end of the second ground portion is electrically connected to a second end of the second radiation portion near the third gap, a second end of the first ground portion and a second end of the second ground portion are both grounded;

wherein when the first feed portion supplies current, the current flows through the first radiation section, toward the first gap, to excite the GPS mode and the WIFI 2.4 GHz mode; wherein when the second feed portion supplies current, the current flows through the second radiation section and the first radiation section, toward the first gap, to excite the WIFI 5 GHz mode; wherein when the third feed portion supplies current, the current flows through the second radiation portion, toward the first gap, and is grounded through the first ground portion, to excite LTE-A middle and high frequency modes; wherein when the third feed portion supplies current, the current flows to the second radiation portion through the first ground portion, toward the third gap, to excite an LTE-A low frequency mode.

9. The wireless communication device of claim 8, wherein the metallic side frame comprises an end portion, a first side portion, and a second side portion, the first side portion and the second side portion are respectively connected to one end of the end portion, the slot is defined on the end portion and extends in directions toward the first side portion and the second side portion, the first gap is defined on the end portion near the first side portion; wherein the second gap is defined on the first side portion near the end portion, extends along a direction toward the metallic back board, the second gap is not communicated with the slot, the first radiation section and the second radiation section are connected with each other.

10. The wireless communication device of claim 9, wherein the third gap is defined on the second side portion near the end portion, the third gap is communicated with the slot.

11. The wireless communication device of claim 10, wherein the antenna structure further comprises a switch circuit, one end of the switch circuit is electrically connected to the second ground portion, another end of the switch circuit is grounded to adjust a frequency of the LTE-A low frequency mode.

12. The wireless communication device of claim 9, wherein the slot is defined on a location of the metallic side frame near the metallic back board, extends along a direction toward the full front screen, a width of the slot is half of a width of the metallic side frame.

13. The wireless communication device of claim 9, wherein the antenna structure further comprises a metallic middle frame, the metallic middle frame is positioned in the metallic housing, a location of the metallic middle frame near the end portion defines a notch, the notch is communicated with the slot.

14. The wireless communication device of claim 13, further comprising a circuit board, wherein the circuit board is received in a space formed by the metallic side frame, the metallic back board, and the metallic middle frame, one end of the circuit board is spaced apart from the metallic side frame, and a headroom is formed between the circuit board and the metallic side frame.

* * * * *